United States Patent
Gerdisch

(10) Patent No.: US 6,480,727 B1
(45) Date of Patent: Nov. 12, 2002

(54) USING INACTIVITY LEVELS TO EXTEND SUBSCRIBER EQUIPMENT BATTERY LIFE

(75) Inventor: Mitchell R. Gerdisch, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 09/228,600

(22) Filed: Jan. 12, 1999

(51) Int. Cl.[7] .................................................. H04B 1/38
(52) U.S. Cl. ........................................ 455/574; 455/343
(58) Field of Search ............................... 455/12.1, 127, 455/343, 435, 550, 572, 573, 574

(56) References Cited

U.S. PATENT DOCUMENTS

| | | | |
|---|---|---|---|
| 4,375,701 A | 3/1983 | Hanson | 455/343 |
| 4,731,814 A | 3/1988 | Becker et al. | 379/62 |
| 4,989,260 A | 1/1991 | Meade | 455/95 |
| 5,033,109 A | 7/1991 | Kawano et al. | 455/90 |
| 5,036,532 A | 7/1991 | Metroka et al. | 379/58 |
| 5,353,330 A | 10/1994 | Fujiwara | 379/58 |
| 5,369,803 A | 11/1994 | Hirasawa et al. | 455/89 |
| 5,423,077 A | 6/1995 | Ueda | 455/89 |
| 5,444,867 A | 8/1995 | Marui et al. | 455/89 |
| 5,507,040 A * | 4/1996 | Eaton et al. | 455/343 |
| 5,519,762 A | 5/1996 | Bartlett | 379/61 |
| 5,548,823 A | 8/1996 | Hirasawa et al. | 455/89 |
| 5,584,055 A | 12/1996 | Murui et al. | 455/89 |
| 5,603,095 A * | 2/1997 | Uola | 455/343 |
| 5,799,256 A * | 8/1998 | Pombo et al. | 455/574 |
| 5,842,141 A * | 11/1998 | Vaihoja et al. | 455/574 |
| 5,870,685 A * | 2/1999 | Flynn | 455/38.3 |
| 6,044,282 A * | 3/2000 | Hlasny | 455/574 |
| 6,138,032 A * | 10/2000 | Hill et al. | 455/343 |
| 6,144,840 A * | 11/2000 | Alton et al. | 455/38.3 |
| 6,157,816 A * | 12/2000 | Anderson et al. | 455/574 |

* cited by examiner

*Primary Examiner*—Nay Maung
*Assistant Examiner*—Quochien B. Vuong
(74) *Attorney, Agent, or Firm*—McAndrews, Held & Malloy, Ltd.

(57) ABSTRACT

A preferred embodiment of the present invention provides a method for extending battery life in a subscriber unit in contact with a system node of a wireless communication network. The method establishes a current inactivity level. The method then periodically checks the state of a power failure flag (which is set when line power is not available and clear otherwise). When the power failure flag is clear and there is no line power present, the method sets the power failure flag and sets a timer to expire after a period of time based on the current inactivity level. When the power-failure flag is set and line power is present, the method clears the power failure flag and performs a default inactivity level registration with the system node requesting to use the system default inactivity level. When the power failure flag is set, no line power is present, the timer has expired, and the current inactivity level is not the system maximum inactivity level, the method performs an incremental inactivity level registration with the system node requesting to use the next highest inactivity level.

37 Claims, 4 Drawing Sheets

US 6,480,727 B1

USING INACTIVITY LEVELS TO EXTEND SUBSCRIBER EQUIPMENT BATTERY LIFE

BACKGROUND OF THE INVENTION

The present invention generally relates to wireless communication systems. In particular, the present invention relates to a method for conserving battery life in a subscriber unit.

Wireless communications have long been used to enable communication between a subscriber unit and a base station without the need for restrictive hardwire connections. The cordless phone, for example, allows communication between a handset and a base. As another example, cellular systems allow a subscriber unit (earth stations, mobile terminals, cellular phones, and the like) to communicate with a radio tower or satellite.

The marriage of cellular transceiver technology with additional interface hardware at the subscriber end allows the cable that runs between a building (such as a home) and a central switching office of a telephone system to be eliminated. That cable is replaced by a radio communications link. A subscriber unit at a particular location may then use a cellular transceiver and associated hardware to interface that transceiver into the telephone cabling of the subscriber's building. This technology is known as a wireless local loop. The combination of cellular transceiver and interface hardware is commonly known as a fixed access unit.

A significant problem that arises when wireless local loops are used in place of traditional subscriber-to-system cable links is that power for the subscriber unit circuitry can no longer be easily provided by the communications service provider, because a physical link over a cable to the subscriber unit is no longer maintained. Thus, the subscriber must supply power to operate the subscriber unit, including the cellular transceiver and interface hardware, as well as the subscriber's communications equipment that is connected to the subscriber unit via the interface hardware.

It is inevitable that there will on occasion be losses of power at locations where a subscriber unit, such as a fixed access unit, is being used. This is particularly true in areas where wireless local loop technology is most frequently used today (e.g., developing countries and rural areas where it is difficult to run landlines), as electric power is frequently intermittent in those locales. In order for communications to remain possible during such power outages, many fixed access units are equipped with a battery back up system.

In the past, however, a fixed access unit could not use battery power for an extended period of time. This caused communications links during line power failures to be short lived and unreliable. Therefore, a need exists for a method that conserves battery life of a subscriber unit as long as possible, allowing for communications service to continue for the maximum possible time.

SUMMARY OF THE INVENTION

It is an object of the present invention to provide a method to greatly increase the battery life of a subscriber unit.

Another object of the present invention is to provide such a method that is compatible with existing cellular standards.

One or more of the foregoing objects are met in whole or in part by a preferred embodiment of the present invention, which provides a method for extending battery life in a subscriber unit in contact with a system node of a wireless communication network. The method establishes a current inactivity level. The method then periodically checks the state of a power failure flag (which is set when line power is not available and clear otherwise).

When the power failure flag is clear and there is no line power present, the method sets the power failure flag and sets a timer to expire after a period of time based on the current inactivity level. When the power-failure flag is set and line power is present, the method clears the power failure flag and performs a default inactivity level registration with the system node requesting to use the system default inactivity level. When the power failure flag is set, no line power is present and the timer has expired, the method performs an incremental inactivity level registration with the system node requesting to use the next highest inactivity level. The method may, however, perform the incremental registration only when the current inactivity level is not at the system maximum inactivity level. A second preferred embodiment of the method of the invention uses a smart battery in lieu of the timer mechanism for determining when to adjust the inactivity level.

DETAILED DESCRIPTION OF THE PREFERRED EMBODIMENT

Figure 1:
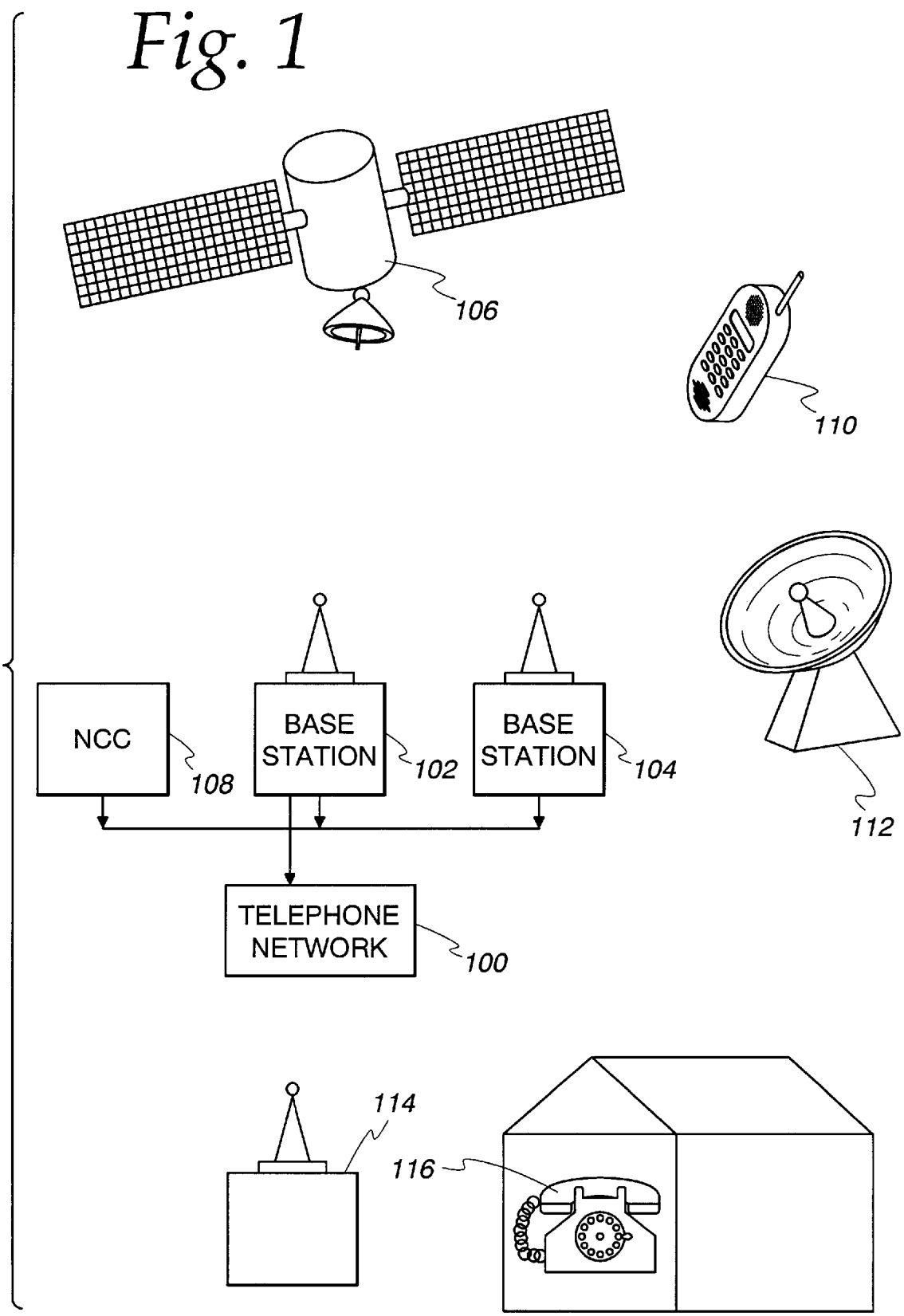
FIG. 1 illustrates the entities typically involved in a wireless communications system.

FIG. 1 illustrates the entities that may be involved in a wireless communications system. Shown in FIG. 1 is a telephone network 100 (e.g., a PSTN), system nodes (base stations 102 and 104 and a satellite 106), a network control center 108, subscriber units (a cellular phone 110, an earth station 112, and a fixed access unit 114) and subscriber local equipment (for example, an analog telephone 116).

In analog wireless communications systems, the transceiver of the subscriber unit, for example subscriber unit 110, typically remained active constantly, so that it could receive all signals sent to it by a system node, for example the base station 102. However, in digital wireless communications systems, the receiver of the subscriber unit 110 need not be on all the time. By powering down the receiver of the subscriber unit 110, as well as other electronics (such as an LCD display, an amplifier and other equipment not essential to the functioning of a subscriber unit 110 while it is in standby mode), battery power may be conserved. In doing so, battery life may be extended.

The receiver of the subscriber unit 110 is typically active for the same amount of time each time (e.g., to receive recurring fixed length time slots that may contain a signal to be received by the subscriber unit 110). The inactivity level of the subscriber unit 110 determines how long the receiver of the subscriber unit 110 is powered down in between periods of being powered on.

The inactivity levels may be defined differently for any particular wireless communications system. For example, under the IS-136 digital cellular standard, the concept of an inactivity level is embodied in the paging frame class (PFC). At the lowest paging frame class (PFC 1), the receiver of the subscriber unit 110 is powered up in such a manner as to receive every possible incoming call notification sent by the system node 102. In between the timeslots (or frames) where it would receive such a call notification, the receiver of the subscriber unit is powered down. As the PFC level being used for communications between the subscriber unit 110 and the system node 102 increases, the receiver of the subscriber unit 110 powers down for longer and longer intervals (corresponding to skipping an increasingly larger number of frames) between each period of being powered on. Thus, the higher the PFC level, the more battery life may be extended. The down side to using higher inactivity levels, such as using a higher PFC under IS-136, is that performance suffers because the subscriber unit 110 may not respond as quickly to communications signals sent by the system node 102 as it would if at the lowest inactivity level.

In the present invention, however, when the subscriber unit 110, 112 or 114 (for example subscriber unit 110) is turned on inside or enters into the service area of a system node 102, 104 or 106 (for example system node 102), the subscriber unit 110 commences an initial registration with the system node 102. During the initial registration, a system default inactivity level may be supplied to the subscriber unit 110 by the system node 102. The system default inactivity level is the inactivity level to be used by the subscriber unit 102 when no special conditions (such as a power loss at a subscriber unit such as a fixed access unit) exist. Also, a system maximum inactivity level may be communicated to the subscriber unit 110 by the system node 102 during the initial registration. The system maximum inactivity level is the highest inactivity level at which the particular system node 102 is capable of supporting communications.

The subscriber unit 110 may then store the system default inactivity level and the system maximum inactivity level, as those parameters may be used by the method at a later time (as will be described below). The subscriber unit 110 may then set its current inactivity level to the system default inactivity level.

The current inactivity level is the inactivity level at which the subscriber unit 110 is currently operating. It is preferable that both the subscriber unit 110 and the system node 102 know which inactivity level the subscriber unit is currently operating at, so that communications may reliably occur between them. For this reason, whenever the subscriber unit 110 desires to change its inactivity level, it preferably performs an inactivity level registration (as will be described below in conjunction with step 316 of FIG. 3).

Figure 2:
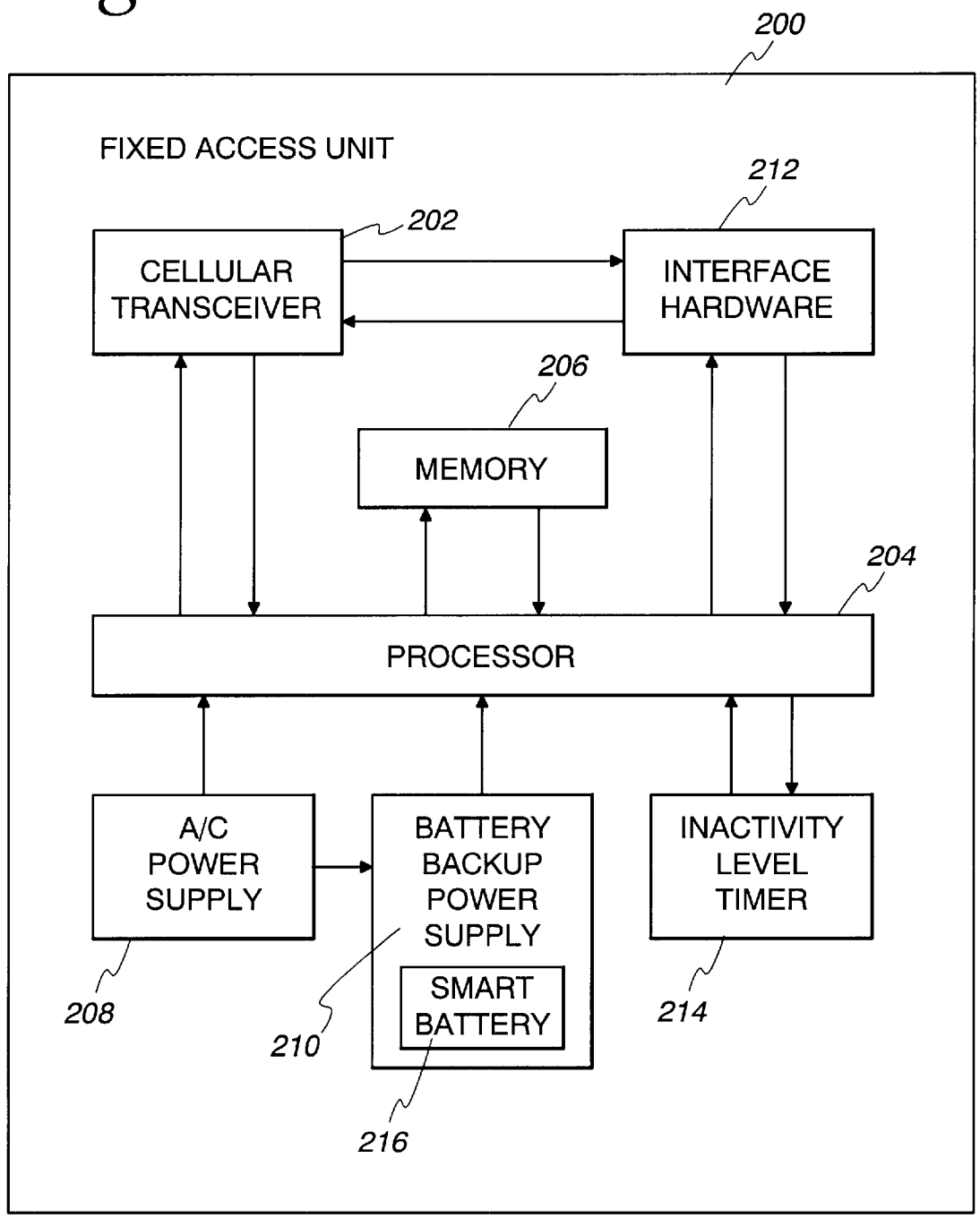
FIG. 2 illustrates a block diagram of the hardware in a fixed access unit that may implement the method of the present invention.

FIG. 2 illustrates a block diagram 200 of a subscriber unit (for example, the fixed access unit 114), including the hardware that may be used to implement the method. The block diagram 200 includes a cellular transceiver 202, a processor 204, a memory 206, an a/c power supply 208, a battery backup power supply 210, interface hardware 212 and an inactivity level timer 214.

The processor 204 is generally responsible for controlling the subscriber unit 114, including periodically executing the power saving technique described in more detail below. The memory 206 is typically used to store values used by the power saving techniques. These values include, for example, the current inactivity level of the subscriber unit, the system default inactivity level, the system maximum inactivity level, either an inactivity level timer table or a battery status table (both explained below in conjunction with FIGS. 3 and 4, respectively) and a power failure flag.

The power failure flag is set when no line power is present; it is otherwise clear. The memory 206 also typically stores software instructions for executing the various steps of the power saving techniques. The inactivity level timer 214 is used by one embodiment of the present invention to determine when the subscriber unit may switch to the next higher inactivity level (if not already at the system maximum inactivity level).

The cellular transceiver 202 establishes and maintains the communications link between the subscriber unit and the system node. The cellular transceiver 202 will be powered down periodically for intervals dependent on the current inactivity level of the subscriber unit. The a/c power supply 208 provides line power to the subscriber unit and also charges the battery of the battery backup power supply 210. The battery backup power supply 210 provides power to the subscriber unit in the event that line power provided by the a/c power supply 208 is lost. The battery in the battery backup power supply 210 may be a smart battery 216 (e.g., one that determines a metric corresponding to the amount of time that it can continue to provide sufficient power to allow the subscriber unit to operate). The interface hardware 212 provides a translation between the signaling levels at the communication equipment throughout the subscriber's location with the cellular transceiver 202 of the subscriber unit.

Figure 3:
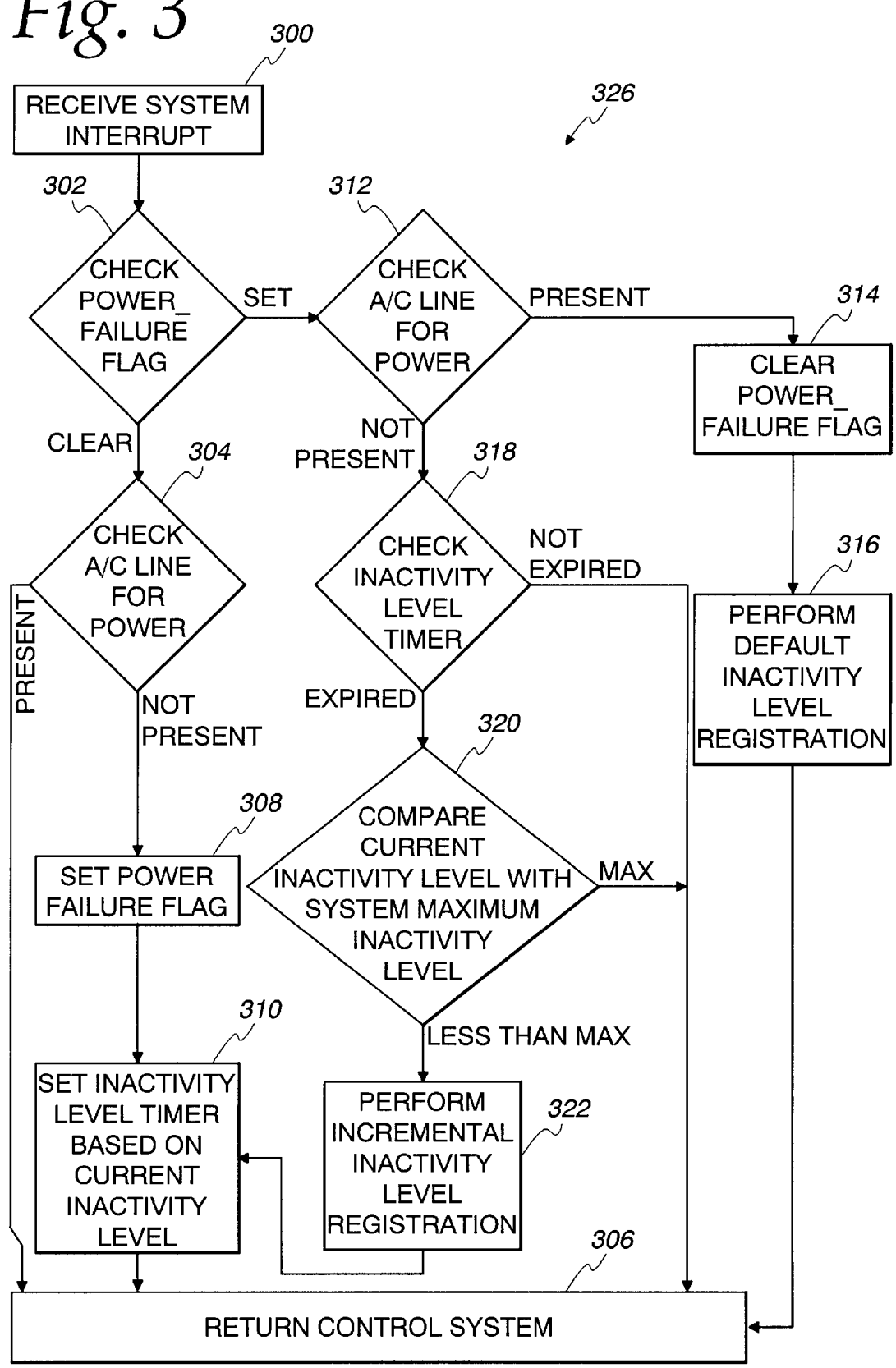
FIG. 3 illustrates a flowchart of one embodiment of a method for extending subscriber unit battery life.

FIG. 3 illustrates a flowchart 326 of one embodiment of a method for extending subscriber equipment battery life, according to a preferred embodiment of the present invention. The flowchart 326 includes an interrupt step 300, a check power failure flag step 302, check line power steps 304 and 312, and a return control step 306. Also illustrated are a set power failure flag step 308, a set inactivity level timer step 310, a clear power failure flag step 314, a default inactivity level registration step 316, and a check inactivity level timer step 318. Additionally, a compare inactivity level to maximum step 320 and an increased inactivity level registration step 322 are shown.

The present power saving methods may be periodically executed by system interrupts within the hardware and/or software of the subscriber unit. Processing of an interrupt begins at the interrupt block 300.

At step 302 the subscriber unit checks whether a power failure flag is set or clear. When the flag is clear, a power failure has not been detected as of the previous interrupt block 300 entry by the system interrupt. If the power failure flag is clear, the power line is checked for the presence of power at step 304. If power is found, processing control passes back to the general program control of the processor of the subscriber unit at step 306.

On the other hand, when the power failure flag is clear and line power is not detected, the power failure flag is set at step 308 and an inactivity level timer is set at step 310 to expire after an amount of time that is dependent on the current inactivity level of the subscriber unit. The subscriber unit may, for example, contain a table that stores the inactivity level timer values corresponding to each of its possible inactivity levels, or these may be given to it during its initial registration with the system node. As an example, the subscriber unit may have the following inactivity timer table (Table 1) in its memory:

TABLE 1

| Inactivity Level | Inactivity Level Timer (minutes) |
|---|---|
| 1 | 30 |
| 2 | 30 |

TABLE 1-continued

| Inactivity Level | Inactivity Level Timer (minutes) |
|---|---|
| 3 | 30 |
| 4 | 60 |
| 5 | 60 |
| 6 | 120 |
| 7 | 120 |

As illustrated in Table 1, if the subscriber unit is currently at inactivity level 4, the inactivity timer is set to expire after 60 minutes. After the inactivity level timer is set, processing control passes back to the general program control of the processor of the subscriber unit at step 306.

If, upon checking the status of the power failure flag at step 302, the flag is determined to be set, the method checks for the return of line power at step 312. If power is present, then the power failure flag is cleared at step 314. Then, at step 316, the subscriber unit commences a default inactivity level registration with the system node, requesting that it be allowed to use the system default in activity level.

During an inactivity level registration process, the subscriber unit sends a request to the system node requesting that it be allowed to switch to a specified inactivity level. There are many ways in which the system node may respond. For example, the system node may send back either a positive acknowledgement signal, indicating to the subscriber unit that it may switch to the specified inactivity level, or a negative acknowledgement signal, indicating to the subscriber unit that it must stay at its current inactivity level. Alternatively, the system node may send a signal representing an inactivity level assigned by the system node to which the subscriber unit should change. Once the inactivity level registration process is complete, the subscriber unit will switch its inactivity level to the appropriate value. Following this inactivity level registration process, processing control passes back to the general program control of the processor of the subscriber unit at step 306.

If, after finding the power failure flag to be set in step 302 and no line power is detected in step 312, the method checks to see if the inactivity level timer has expired at step 318. If the inactivity level timer has not expired, processing control passes back to the general program control of the processor of the subscriber unit at step 306. If the inactivity level timer has expired, the method determines if the current activity level is equal to the system maximum inactivity level at step 320. If the current inactivity level is less than the system maximum inactivity level, the subscriber unit, at step 322, commences an incremental inactivity level registration with the system node, requesting that it be allowed to set its inactivity level to the next highest inactivity level. This inactivity level registration is carried out in a manner described above with respect to the registration step 316, and upon its completion, the subscriber unit sets its current inactivity level to the appropriate value. If a new inactivity level is set, the inactivity level timer is set, at step 310, to expire after the time corresponding to the current inactivity level.

If the method determines, at step 320, that the current inactivity level at the time the inactivity level timer expires was the maximum supported inactivity level, no inactivity level registration need occur and the inactivity level timer need not be set. Instead, processing control passes back to the general program control of the processor of the subscriber unit at step 306. In other words, there is no higher inactivity state that can be entered and the subscriber unit simply awaits return of line power.

Figure 4:
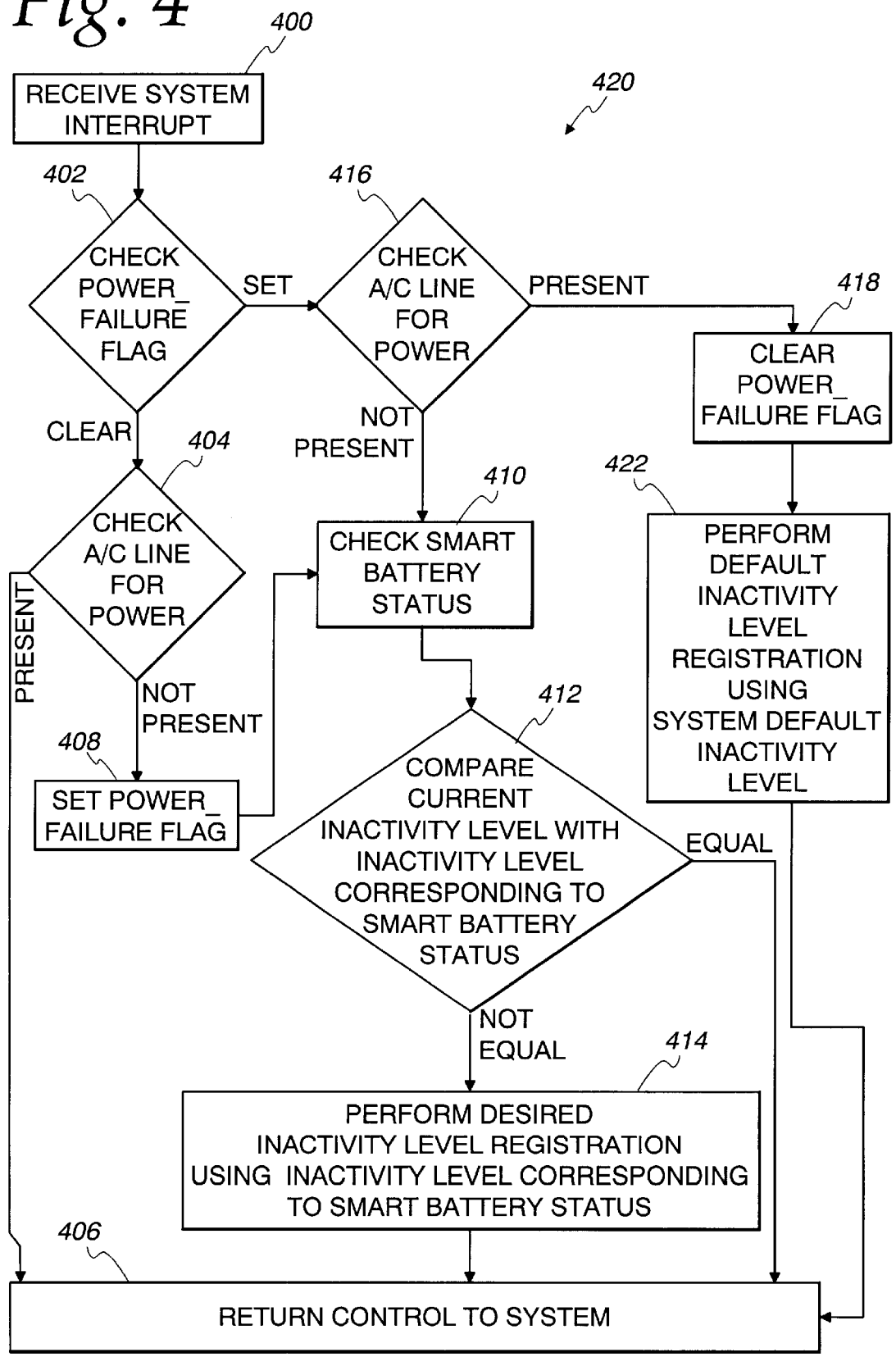
FIG. 4 illustrates a flowchart of a second embodiment of a method for extending subscriber unit battery life.

FIG. 4 illustrates a flowchart 420 of a second embodiment of a method for extending subscriber equipment battery life, according to a preferred embodiment of the present invention. The flowchart 420 includes an interrupt step 400, a check power failure flag step 402, check line power steps 404 and 416, and a return control step 406. Also shown are a set power failure flag step 408, a check smart battery status step 410, a compare inactivity level step 412, a desired inactivity level registration step 414, a clear power failure flag step 418 and a default inactivity level registration step 420.

In the embodiment shown in FIG. 4, the method does not use an inactivity level timer as in the embodiment of FIG. 3. Instead, the subscriber unit makes use of a smart battery that has the ability to determine how much life it has left or that outputs a metric representing that information. The table corresponding to various timer lengths is replaced with a table that relates the status of the smart battery to a corresponding inactivity level.

As in the embodiment discussed in conjunction with FIG. 3, the embodiment in FIG. 4 begins after an interrupt at the interrupt block 400. At step 402, the subscriber unit checks whether a power failure flag is set or clear. When the flag is clear, a power failure has not been detected as of the previous interrupt block 400 entry by the system interrupt. If the power failure flag is clear, the power line is checked for the presence of power at step 404. If power is found, processing control passes back to the general program control of the processor of the subscriber unit at step 406.

On the other hand, if the power failure flag is clear and line power is not detected, then the power failure flag is set at step 408 and the battery status of the smart battery is checked at step 410. The subscriber unit may contain a battery status table (e.g., Table 2) that relates the status (e.g., remaining charge, time until charge depletion, and the like) of the smart battery to a corresponding inactivity level. This table may be a set of constants within the subscriber unit, or it may be stored after having been received from the system node during the initial registration.

TABLE 2

| Smart Battery Status | Inactivity Level |
|---|---|
| Above 80% | 1 |
| 60% to 80% | 2 |
| 40% to 60% | 3 |
| 30% to 40% | 4 |
| 20% to 30% | 5 |
| 10% to 20% | 6 |
| Below 10% | 7 |

At step 412, The subscriber unit compares the current inactivity level to the inactivity level corresponding to the current smart battery status, as indicated by the battery status table. If the inactivity levels are the same, processing control passes back to the general program control of the processor of the subscriber unit at step 406. If the inactivity levels are not the same, the subscriber until commences a desired inactivity level registration at step 414, requesting that it be allowed to use the inactivity level indicated in the battery status table. Following this inactivity level registration, processing control passes back to the general program control of the processor of the subscriber unit at step 406.

If, upon checking the status of the power failure flag at step 402, the flag is determined to be set, the method checks for the return of line power at step 416. If power is present, then the power failure flag is cleared at step 418. Then, at step 420, the subscriber unit commences a default inactivity level registration with the system node, requesting that it be allowed to use the system default inactivity level. Following this inactivity level registration process, processing control passes back to the general program control of the processor of the subscriber unit at step 406.

If, after finding the power failure flag to be set in step 402, no line power is detected at step 416, the method checks the status of the smart battery in step 410. Then, at step 412, the method compares the current inactivity level to the inactivity level in the battery status table corresponding to the current battery status. If the inactivity level indicated in the battery status table is the same as the current inactivity level, processing control passes back to the general program control of the processor of the subscriber unit at step 406. If it is determined at step 412 that the current inactivity level differs from the activity level indicated by the battery status table, the subscriber unit commences a desired inactivity level registration at step 414, requesting that it be allowed to use the inactivity level indicated in the battery status table. Following this inactivity level registration, processing control passes back to the general program control of the processor of the subscriber unit at step 406.

When the current inactivity level is the system maximum inactivity level, no inactivity level registration need occur. There is no possible higher inactivity state that can be entered and the subscriber unit awaits return of line power.

The present method thus extends battery life of a subscriber unit. The method provides a technique by which the subscriber unit in a wireless communications system can send a request to the system node that it be allowed to operate at increasingly higher inactivity levels. The requests may be made as either more time without line power passes or the battery status of a smart battery diminishes. Furthermore, the method is compatible with existing cellular standards, such as IS-136.

While particular elements, embodiments and applications of the present invention have been shown and described, it will be understood that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for extending battery life in a subscriber unit that communicates with a system node of a wireless communication network, the method comprising:
   establishing a current inactivity level; and
   when line power for supplying power to the subscriber unit is absent, performing an incremental inactivity level registration with a system node requesting to use a next highest inactivity level and setting the inactivity level in accordance with a response from the system node.

2. The method of claim 1, further comprising checking the state of a power-failure indicator.

3. The method of claim 2, wherein the step of checking comprises periodically checking the state of a power-failure flag.

4. The method of claim 3, wherein the step of performing further comprises performing an incremental inactivity level registration after an inactivity level timer has expired.

5. The method of claim 3, further comprising:
   when the power-failure flag is clear and line power is absent, setting the power-failure flag and setting an inactivity level timer to expire after a period of time based on the current inactivity level.

6. The method of claim 3, further comprising:
   when line power returns, performing a default inactivity level registration with the system node and clearing the power-failure flag.

7. The method of claim 1, further comprising:
   when line power returns, performing a default inactivity level registration with the system node.

8. The method of claim 1, wherein the step of performing comprises the step of performing an incremental inactivity level registration when the current inactivity level is less than a maximum inactivity level.

9. The method of claim 1, wherein the step of establishing comprises the step of establishing a current inactivity level according to a paging frame class of the IS-136 digital cellular standard.

10. A method for extending battery life in a subscriber unit having a battery backup power supply using a smart battery and communicating with a system node of a wireless communication network, the method comprising the steps of:
    establishing a current inactivity level;
    determining a status of a smart battery;
    performing an inactivity level registration with a system node requesting to use an inactivity level associated with the status of the smart battery; and
    setting the inactivity level in accordance with a response from the system node.

11. The method of claim 10, further comprising checking the state of a power-failure indicator.

12. The method of claim 11, wherein the step of checking comprises periodically checking the state of a power-failure flag.

13. The method of claim 12, further comprising:
    when the power-failure flag is clear and line power is absent, setting the power-failure flag.

14. The method of claim 10, wherein the step of performing comprises the step of performing an inactivity level registration when the current inactivity level is different than the inactivity level associated with the status of the smart battery.

15. The method of claim 11, further comprising:
    when line power returns, performing a default inactivity level registration with the system node.

16. The method of claim 10, wherein the step of performing comprises the step of performing an inactivity level registration when the current inactivity level is less than a maximum inactivity level.

17. The method of claim 10, wherein the step of establishing comprises the step of establishing a current inactivity level according to a paging frame class of the IS-136 digital cellular standard.

18. A subscriber unit in a wireless communications system for providing extended battery life, the subscriber unit comprising:
    a battery for supplying power to the subscriber unit;
    a cellular transceiver;
    a processor connected to the transceiver; and
    a memory connected to the processor, the memory comprising instructions for:
    establishing a current inactivity level;
    performing an incremental inactivity level registration with a system node requesting to use a next highest inactivity level when line power for supplying power to the subscriber unit is absent and setting the inactivity level in accordance with a response from the system node.

19. The subscriber unit of claim 18, wherein the memory further comprises instructions for checking the state of a power-failure indicator.

20. The subscriber unit of claim 19, wherein the instructions for checking the state of a power-failure indicator comprise instructions for periodically checking the state of a power-failure flag.

21. The subscriber unit of claim 20, wherein the memory further comprises instructions for determining when the power-failure flag is clear and line power is absent, and in response setting the power-failure flag and setting an inactivity level timer to expire after a period of time based on the current inactivity level.

22. The subscriber unit of claim 18, wherein the instructions for performing an incremental inactivity level registration comprise instructions for performing an incremental inactivity level registration when an inactivity level timer has expired.

23. The subscriber unit of claim 18, wherein the memory further comprises instructions for determining when line power returns, and in response performing a default inactivity level registration with the system node.

24. The subscriber unit of claim 18, wherein the memory further comprises instructions for performing an incremental inactivity level registration when the current inactivity level is less than a maximum inactivity level.

25. The subscriber unit of claim 18, wherein the battery is a smart battery providing an output indicative of the smart battery status.

26. The subscriber unit of claim 25, wherein the instructions for performing an incremental inactivity level registration comprise instructions for performing an incremental inactivity level registration when the current inactivity level is different than a target inactivity level associated with the smart battery status.

27. The subscriber unit of claim 26, wherein the memory further comprises instructions for determining when line power is absent, and in response performing an inactivity level registration based on the target inactivity level.

28. The subscriber unit of claim 18, wherein the instructions for establishing a current inactivity level establish a current inactivity level according to a paging frame class of the IS-136 digital cellular standard.

29. Apparatus for extending battery life in a subscriber unit that communicates with a system node of a wireless communication network, the apparatus comprising:

means for establishing a current inactivity level; and means for performing an incremental inactivity level registration with a system node requesting to use a next highest inactivity level and for setting the inactivity level in accordance with a response from the system node when line power for supplying power to the subscriber unit is absent.

30. The apparatus of claim 29, further comprising means for checking the state of a power-failure indicator.

31. The apparatus of claim 30, wherein the means for checking comprises means for periodically checking the state of a power-failure flag.

32. The apparatus of claim 31, wherein the means for performing further comprises means for performing an incremental inactivity level registration after an inactivity level timer has expired.

33. The apparatus of claim 31, further comprising:

means for setting the power-failure flag and for setting an inactivity level timer to expire after a period of time based on the current inactivity level when the power-failure flag is clear and line power is absent.

34. The apparatus of claim 31, further comprising:

means for performing a default inactivity level registration with the system node and for clearing the power-failure flag when line power returns.

35. The apparatus of claim 29, further comprising:

means for performing a default inactivity level registration with the system node when line power returns.

36. The apparatus of claim 29, wherein the means for performing comprises means for performing an incremental inactivity level registration when the current inactivity level is less than a maximum inactivity level.

37. The apparatus of claim 29, wherein the means for establishing comprises means for establishing a current inactivity level according to a paging frame class of the IS-136 digital cellular standard.

* * * * *